US010801413B2

(12) United States Patent
Roberge

(10) Patent No.: US 10,801,413 B2
(45) Date of Patent: Oct. 13, 2020

(54) ELECTROMAGNETIC ANTI-WINDMILLING SYSTEM

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 935 days.

(21) Appl. No.: 15/089,891

(22) Filed: Apr. 4, 2016

(65) Prior Publication Data
US 2017/0284302 A1    Oct. 5, 2017

(51) Int. Cl.
*F01D 15/10* (2006.01)
*F02C 7/26* (2006.01)
(Continued)

(52) U.S. Cl.
CPC ............... *F02C 7/26* (2013.01); *F01D 15/10* (2013.01); *F01D 21/006* (2013.01); *F01D 25/28* (2013.01); *F02C 3/107* (2013.01); *F02C 6/14* (2013.01); *F02C 7/06* (2013.01); *F02C 7/36* (2013.01); *F02K 3/06* (2013.01); *F04D 19/002* (2013.01);
(Continued)

(58) Field of Classification Search
CPC .... F02C 7/26; F02C 3/107; F02C 6/14; F02C 7/06; F02C 7/36; F01D 15/10; F01D 21/006; F01D 25/28; F02K 3/06; F04D 19/002; F04D 25/026; F04D 25/028; F05D 2220/32; F05D 2220/766; F05D 2220/768; F05D 2260/40311; F05D 2260/404; F05D 2260/903

USPC ............. 415/1, 10; 60/773, 226.1; 188/267; 310/92; 192/84.1
See application file for complete search history.

(56) References Cited

U.S. PATENT DOCUMENTS

| 811,317 A | 1/1906 | Newton |
|---|---|---|
| 3,133,416 A | 5/1964 | Mock |

(Continued)

FOREIGN PATENT DOCUMENTS

| EP | 1873358 | 1/2008 |
|---|---|---|
| EP | 1918564 | 5/2008 |
| WO | 2015060912 | 4/2015 |

OTHER PUBLICATIONS

European Search Report for Application No. 17164788.6 dated Aug. 24, 2017.

*Primary Examiner* — Kenneth Bomberg
*Assistant Examiner* — Brian Christopher Delrue
(74) *Attorney, Agent, or Firm* — Carlson, Gaskey & Olds, P.C.

(57) ABSTRACT

A gas turbine engine including a compressor has a first compressor section and a second compressor section, a combustor fluidly connected to the compressor, and a turbine fluidly connected to the combustor. The turbine includes a first turbine section and a second turbine section. A first shaft connects the first compressor section and the first turbine section. A second shaft connects the second compressor section and the second turbine section. A fan is connected to the first shaft via a geared architecture. The first shaft includes at least one magnetic section. An electromagnet is disposed radially outward of the first shaft at an axial location of the at least one magnetic section, relative to an axis defined by the gas turbine engine.

19 Claims, 4 Drawing Sheets

(51) Int. Cl.
| | | |
|---|---|---|
| *F01D 21/00* | (2006.01) | |
| *F02K 3/06* | (2006.01) | |
| *F01D 25/28* | (2006.01) | |
| *F02C 3/107* | (2006.01) | |
| *F02C 6/14* | (2006.01) | |
| *F02C 7/06* | (2006.01) | |
| *F02C 7/36* | (2006.01) | |
| *F04D 19/00* | (2006.01) | |
| *F04D 25/02* | (2006.01) | |

(52) U.S. Cl.
CPC ......... *F04D 25/026* (2013.01); *F04D 25/028* (2013.01); *F05D 2220/32* (2013.01); *F05D 2220/766* (2013.01); *F05D 2220/768* (2013.01); *F05D 2260/404* (2013.01); *F05D 2260/40311* (2013.01); *F05D 2260/903* (2013.01)

(56) References Cited

U.S. PATENT DOCUMENTS

| | | | | |
|---|---|---|---|---|
| 3,812,411 A * | 5/1974 | Johnson | ............... | H02P 3/12 290/17 |
| 3,994,634 A | 11/1976 | Riddle et al. | | |
| 5,494,421 A | 2/1996 | Wada et al. | | |
| 5,731,649 A * | 3/1998 | Caamano | ............... | H02K 1/02 310/179 |
| 6,784,565 B2 * | 8/2004 | Wall | ............... | H02J 1/10 290/52 |
| 7,621,117 B2 * | 11/2009 | Dooley | ............... | F01D 15/10 60/226.1 |
| 7,849,668 B2 | 12/2010 | Sheridan | | |
| 8,097,972 B2 * | 1/2012 | Macchia | ............... | F01D 15/10 290/52 |
| 8,278,774 B2 * | 10/2012 | Macchia | ............... | F01D 15/10 290/52 |
| 8,966,876 B2 * | 3/2015 | Suciu | ............... | F02C 9/16 184/6.11 |
| 2002/0189231 A1 * | 12/2002 | Franchet | ............... | F02C 3/113 60/226.1 |
| 2005/0135929 A1 * | 6/2005 | Waddleton | ............... | B64C 11/38 416/1 |
| 2006/0260323 A1 * | 11/2006 | Moulebhar | ............... | F01D 21/003 60/793 |
| 2007/0245709 A1 * | 10/2007 | Dooley | ............... | F02C 7/262 60/226.1 |
| 2007/0289310 A1 * | 12/2007 | Dooley | ............... | F01D 15/10 60/773 |
| 2010/0086403 A1 * | 4/2010 | McCune | ............... | F01D 25/20 415/229 |
| 2012/0133150 A1 * | 5/2012 | Dooley | ............... | F01D 15/10 290/1 A |
| 2013/0098059 A1 | 4/2013 | Suciu et al. | | |
| 2014/0244051 A1 * | 8/2014 | Rollins | ............... | B01F 3/04078 700/282 |
| 2015/0292577 A1 * | 10/2015 | Anglin | ............... | F02C 7/00 74/577 R |
| 2015/0354407 A1 | 12/2015 | Anglin | | |
| 2015/0377066 A1 | 12/2015 | Duong et al. | | |

* cited by examiner

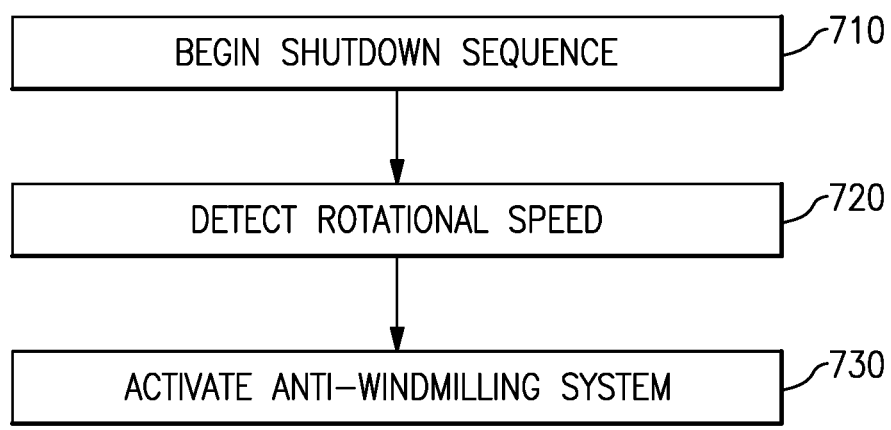

ELECTROMAGNETIC ANTI-WINDMILLING SYSTEM

TECHNICAL FIELD

The present disclosure relates generally to anti-windmilling systems for a gas powered turbine, and more specifically to an electromagnetic anti-windmilling system.

BACKGROUND

Geared turbofan engines utilize a gas powered turbine engine to drive rotation of a fan through a gear system. The gas powered turbine engine includes a compressor that draws in and compresses air, a combustor that mixes compressed air with a fuel and ignites the mixture, and a turbine across which the combustion products are expanded. The expansion of the combustion products across the turbine drives the turbine to rotate. Rotation of the turbine is communicated to the compressor via a shaft and drives rotation in the compressor as well. The rotation of the shaft is also translated through the gear system to the fan, which is positioned fore of the compressor.

When a geared turbofan engine is shut down while on the ground, such as when an aircraft is parked at an airfield, crosswinds entering the geared turbofan can undesirably drive rotation of the fan. The rotation can be either clockwise or counterclockwise, dependent on the direction of the wind relative to the forward face of the aircraft engine. This rotation is referred to as windmilling.

Rotation of the fan, in turn, is translated to the shaft through the gearing system connecting the fan to the shaft. In some geared turbofans, one or more components within the engine require active lubrication while the engine is rotating in order to prevent damage or deterioration to the components.

SUMMARY OF THE INVENTION

In one exemplary embodiment a gas turbine engine includes a compressor having a first compressor section and a second compressor section, a combustor fluidly connected to the compressor, a turbine fluidly connected to the combustor, the turbine having a first turbine section and a second turbine section, a first shaft connecting the first compressor section and the first turbine section, a second shaft connecting the second compressor section and the second turbine section, a fan connected to the first shaft via a geared architecture, the first shaft including at least one magnetic section, and an electromagnet disposed radially outward of the first shaft at an axial location of the at least one magnetic section, relative to an axis defined by the gas turbine engine.

In another exemplary embodiment of the above described gas turbine engine the at least one magnetic section includes a plurality of magnetic sections defined circumferentially around the first shaft at a single axial location.

In another exemplary embodiment of any of the above described gas turbine engines the plurality of magnetic sections are distributed about the first shaft in a balanced distribution.

In another exemplary embodiment of any of the above described gas turbine engines the balanced distribution is an even distribution.

In another exemplary embodiment of any of the above described gas turbine engines the at least one magnetic section extends less than a full circumference of the first shaft.

In another exemplary embodiment of any of the above described gas turbine engines the electromagnet is mounted to and structurally supported by an engine static structure.

Another exemplary embodiment of any of the above described gas turbine engines further includes a controller controllably coupled to the electromagnet, the controller storing instructions configured to cause the controller to activate the electromagnet during engine shutdown, and de-activate the electromagnet during engine startup.

In another exemplary embodiment of any of the above described gas turbine engines the controller further comprises instructions configured to activate the electromagnet in response rotation speed of the first shaft falling below a predefined threshold.

In another exemplary embodiment of any of the above described gas turbine engines the electromagnet is coupled to an on-board power storage device, such that the electromagnet is powered by the on-board power storage device.

In another exemplary embodiment of any of the above described gas turbine engines the electromagnet is coupled to a power distribution system, and wherein the power distribution system is configured to receive power from a ground power source.

In another exemplary embodiment of any of the above described gas turbine engines the first compressor section is a low pressure compressor section relative to the second compressor section, and wherein the first turbine section is a low pressure turbine section relative to the second turbine section.

In another exemplary embodiment of any of the above described gas turbine engines the at least one magnetic section is positioned on the first shaft forward of second compressor section, relative to an expected direction of fluid flow through the gas turbine engine.

In another exemplary embodiment of any of the above described gas turbine engines the at least one magnetic section is positioned axially within one of an intermediate case and a fan drive gear section of the gas turbine engine.

An exemplary method for preventing rotation of a shaft in a gas turbine engine includes activating an electromagnet within a gas turbine engine; preventing a shaft from rotating using a magnetic field generated by the electromagnet, thereby preventing a fan mechanically coupled to the shaft from rotating.

In another example of the above described exemplary method for preventing rotation of a shaft in a gas turbine engine activating the electromagnetic within the gas powered turbine is performed in response to a rotation speed of a low shaft falling below a speed threshold.

In another example of any of the above described exemplary methods for preventing rotation of a shaft in a gas turbine engine the speed threshold is a rotational speed below which the magnetic field is sufficient to stop rotation of the shaft.

Another example of any of the above described exemplary methods for preventing rotation of a shaft in a gas turbine engine further includes powering a lubrication system via rotation of a high shaft at least until the electromagnet is activated.

In another example of any of the above described exemplary methods for preventing rotation of a shaft in a gas turbine engine the lubrication system provides lubrication to at least one journal bearing.

In one exemplary embodiment an anti-windmilling system for a gas turbine engine includes an electromagnetic mounted to an engine static structure, and a shaft radially inward of the electromagnet, the shaft including at least one magnetic section at a same axial position of the electromagnet, relative to an axis defined by the shaft.

In another exemplary embodiment of the above described anti-windmilling system for a gas turbine engine the electromagnet is mounted in one of an engine intermediate case and between a fan drive gear system at a compressor.

These and other features of the present invention can be best understood from the following specification and drawings, the following of which is a brief description.

BRIEF DESCRIPTION OF THE DRAWINGS

FIG. 8 illustrates a flowchart demonstrating an exemplary operation of an electromagnetic anti-windmilling system.

DETAILED DESCRIPTION OF AN EMBODIMENT

Figure 1:
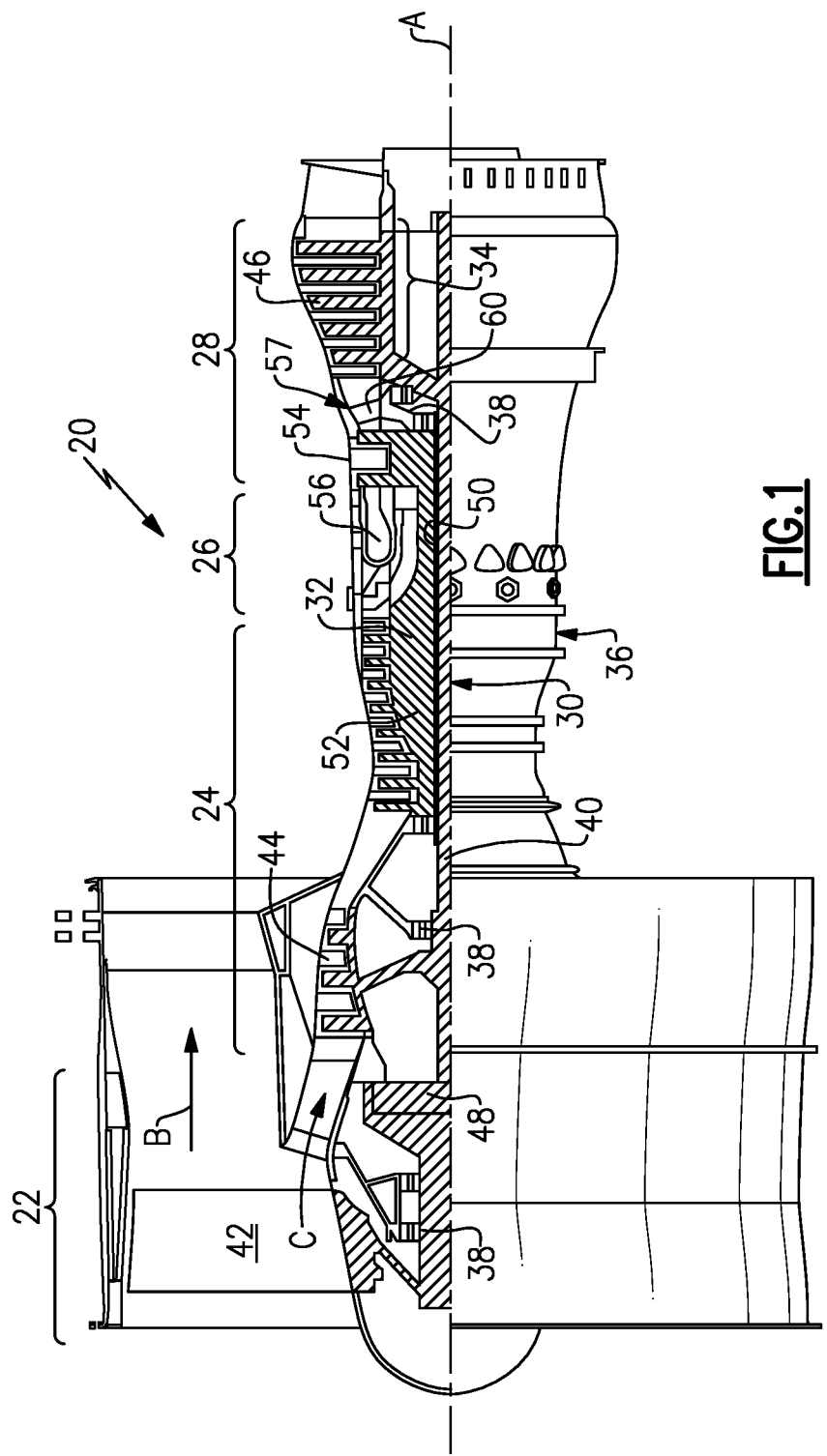
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/s).

Some example geared turbofan engines are subject to rotation due to wind, or other atmospheric conditions, while the engine is on the ground at rest and inoperative. This rotation is otherwise referred to as windmilling, and can cause rotation in either a clockwise or counter-clockwise direction depending on the direction of the prevailing wind relative to the engine. Further, some example geared turbofan engines include components, such as journal bearings in a fan drive gear system, that are highly sensitive to wear in the absence of active provision of lubrication. A delay between an initial occurrence of windmilling and application of either a lubricant or an anti-windmilling system can result in undesirable wear on the internal engine components. Such a delay is present in systems that utilize rotation due to windmilling to activate a brake or to power a lubrication system.

Figure 2:
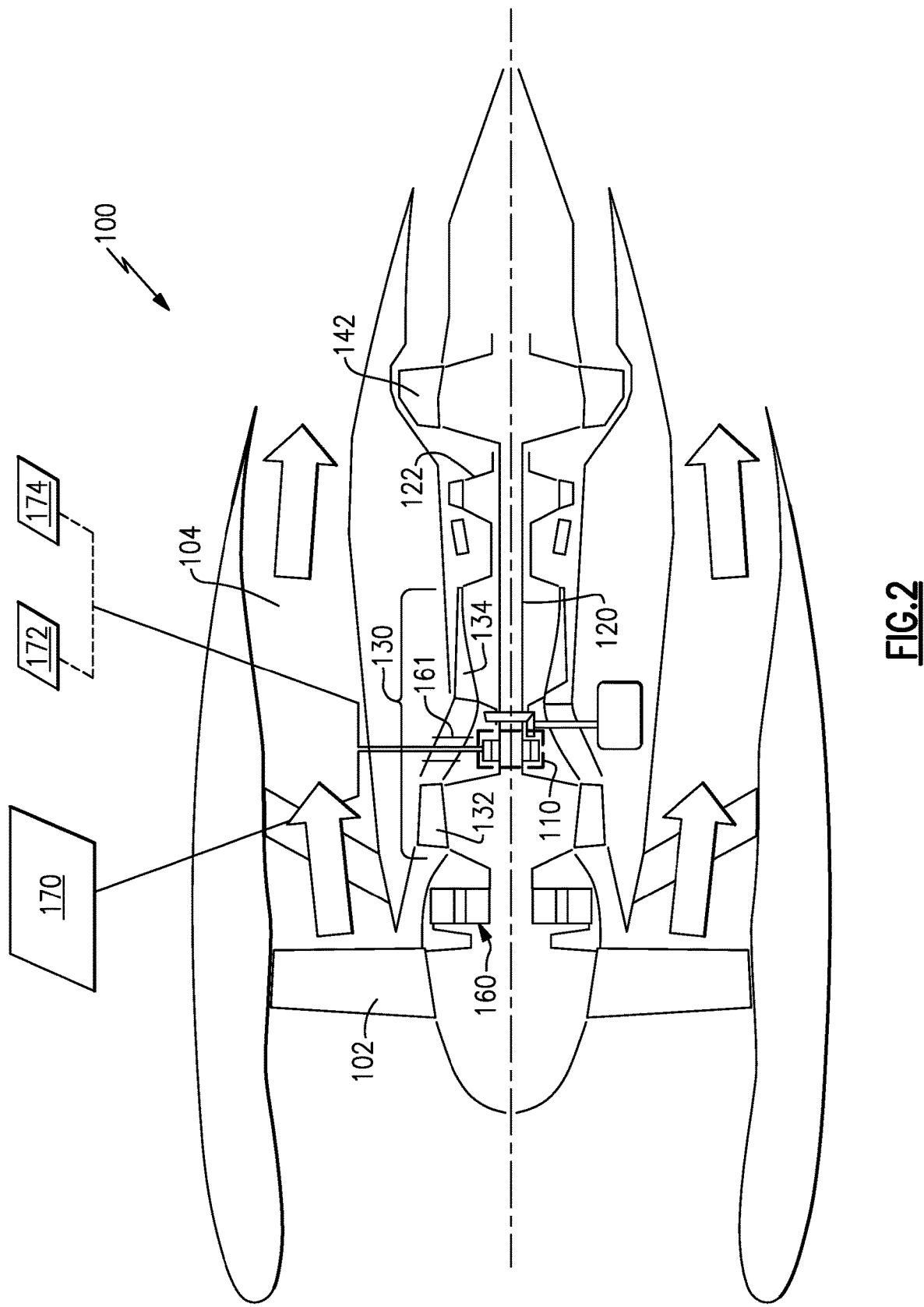
FIG. 2 schematically illustrates an exemplary gas turbine engine including an electromagnetic anti-windmilling system.

With continued reference to FIG. 1, FIG. 2 schematically illustrates a gas turbine engine 100 including an electromagnetic anti-windmilling system 110. The anti-windmilling system 110 is positioned axially along a low speed shaft 120 in an intermediate case structure between a low pressure compressor 132 and a high pressure compressor 134 of a compressor system 130. In alternative examples, the anti-windmilling system 110 can be positioned proximate a fan drive gear system 160 connecting a fan 102 to the low speed shaft 120. In yet further alternate example systems, the anti-windmilling system 110 can be located aft of a low pressure turbine section 142. In such an example, the anti-windmilling system 110 would further include cooling systems capable of cooling and protecting electronics within an electromagnetic system from thermal stresses and environmental effects including reduction in magnetic properties as a function of temperature (Curie point).

While an aircraft including the geared turbofan engine 100 is parked at an airfield, or the engine 100 is otherwise inoperative while on the ground, wind can pass through a bypass flowpath 104 and drive the fan 102 to rotate. This wind can pass through in either a generally forward or aft direction, with the direction of the wind controlling the direction of imparted rotation of the fan. The rotation of the fan 102, in turn, is translated to the low speed shaft 120 through the fan drive gear system 160.

In the example of FIG. 2, the fan drive gear system 160 utilizes journal bearings. During standard operation of the engine 100, engine or aircraft mechanical or electrical power drives an active lubrication system to provide lubricant to the journal bearings according to any known active lubrication system. While the engine 100 is inoperative, however, the active lubricant systems are non-functional. Rotation of the fan 102 and/or high compressor 134 due to wind passing through the engine 100 can be too low to drive the active lubrication systems. In other examples the delay between initial rotation of the fan due to windmilling and the activation of an active lubrication system can be too long, causing the journal bearings to be subject to undesirable wear.

In order to prevent wear on the journal bearings, or any other undesirable result of windmilling within the engine 100, the anti-windmilling system 110 locks the low speed shaft 120 in position via an interaction between an electromagnet mounted to a static structure of the engine, and a corresponding segment of magnetic material on the low speed shaft 120. As used herein, "magnetic material" refers to any material that is, or can be made to be, attracted by a magnetic field. One such example is a ferrous material, however, one of skill in the art will understand that alternative materials having similar properties could also be used to the same effect. Operations of the electromagnet are controlled by an engine controller 170 located on the aircraft. The engine controller 170 can be either a dedicated controller that only controls the anti-windmilling system 110, or a general aircraft controller including programing and controls for controlling the anti-windmilling system 110. The electromagnetic anti-windmilling system 110 is powered by a connection to one of a power storage component 172 and/or a land based power source 174. Power and control signals from the controller 170 to the anti-windmilling system 110 are routed through hollow struts in the intermediate case 161.

With continued reference to the structure of FIG. 2, FIG. 8 illustrates a brief overview of an example operation of the geared turbofan engine 100. Upon landing, or any other event requiring shut down of the engine 100 while the aircraft is on the ground, the controller 170 begins a shut down sequence of the engine 100 in a "begin shutdown step" 710 and detects the rotational speed of the low speed shaft 120 in a "detect rotational speed" step 720. In alternative systems, the engine controller can also be in communication with various other vehicle sensors, including, but not limited to, weight on wheels sensors and vehicle velocity sensors. Such sensors allow the engine controller to determine if the aircraft is on the ground (weight on wheels) and if the aircraft has stopped moving (vehicle velocity). These determinations allow the controller to prevent the anti-windmilling lock from being applied while the aircraft is moving in flight or on the ground.

When the controller 170 detects the speed falling below a predefined threshold, the controller 170 connects a power source 172, 174 to the electromagnet portion of the electromagnetic anti-windmilling device, causing the anti-windmilling system 110 to activate in an "activate anti-windmilling system" step 730. The activation of the anti-windmilling system 110 moves the low speed shaft 120 into a locked position, thereby preventing further rotation of the fan 102. By way of example, the threshold speed can be a speed at which the rotational inertia of the low speed shaft 120 is no longer sufficient to overcome the generated magnetic field of the electromagnet.

In alternative examples, the controller 170 activates the anti-windmilling system 110 when the controller 170 detects that the low speed shaft 120 has stopped rotation (e.g. a threshold of marginally greater than 0 rotational speed). In either example, a high speed shaft 122 of the gas powered turbine engine requires a longer time to stop rotating, and drives active lubrication systems to provide lubrication to the journal bearings in the fan drive gear system 160 until after the anti-windmilling system 110 has activated.

By following this sequence, the controller 170 ensures that lubrication is provided to the fan drive gear system at all times when the gearing is rotating, including while the engine is incapable of actively lubricating the fan drive gear system.

Figure 3:
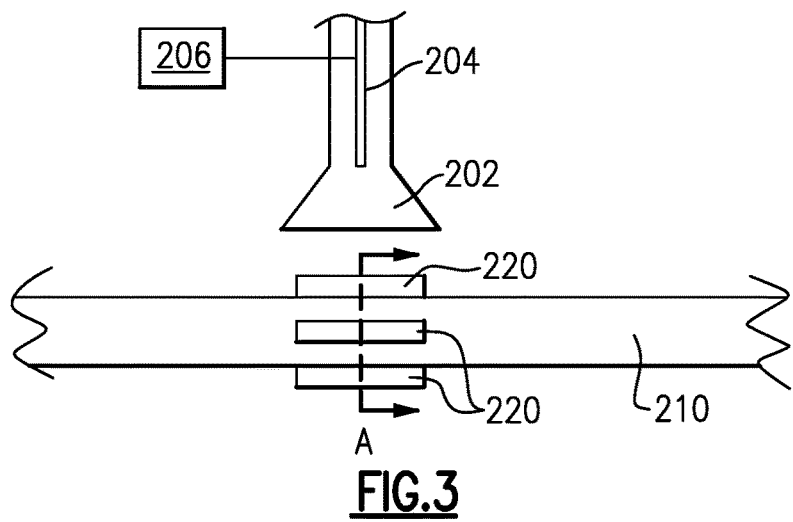
FIG. 3 schematically illustrates an anti-windmilling system, isolated from the surrounding elements of the gas turbine engine.
Figure 4:
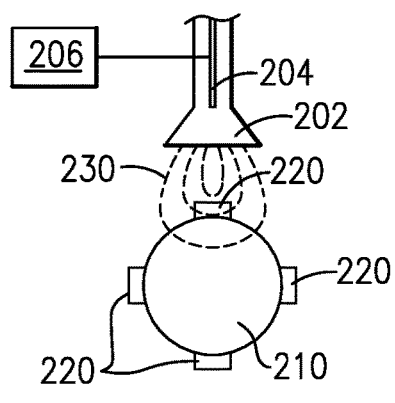
FIG. 4 schematically illustrates a cross sectional view of FIG. 3.
Figure 6:
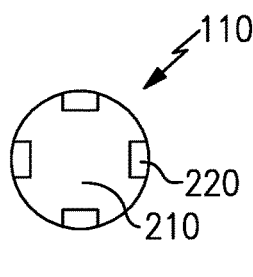
FIG. 6 schematically illustrates an alternate design of a magnetic shaft component.
Figure 7:
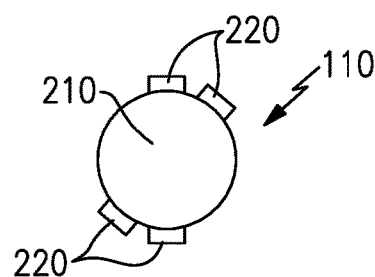
FIG. 7 schematically illustrates another alternate design of a magnetic shaft component.

With continued reference to FIG. 2, FIG. 3 schematically illustrates the anti-windmilling system 110, isolated from the surrounding engine environment. FIG. 4 schematically illustrates the anti-windmilling system 110 of FIG. 3, along a cross sectional view line A. As described above, the anti-windmilling system 110 includes an electromagnet 202 mounted to the static structure of the engine 100. The electromagnet 202 includes a power connection 204 configured to provide power to the electromagnet 202. The provision of power through the power connection 204 is controlled by a controller 206. Radially inward of the electromagnet 202 is the low speed shaft 210. At the axial position of the electromagnet 202, along the low speed shaft 210 are multiple magnetic sections 220.

Upon provision of electrical power to the electromagnet 202, a magnetic field 230 is generated. The magnetic field 230 intersects the low speed shaft 210, and attracts the magnetic sections 220. The magnetic section 220 nearest to the electromagnet 202 experiences the strongest attraction, and the low speed shaft 210 is rotated until the magnetic sections 220 are aligned with the magnetic field in an equilibrium position. In the example of FIGS. 3 and 4, the magnetic sections 220 are distributed evenly about the low speed shaft 210.

Figure 5A:
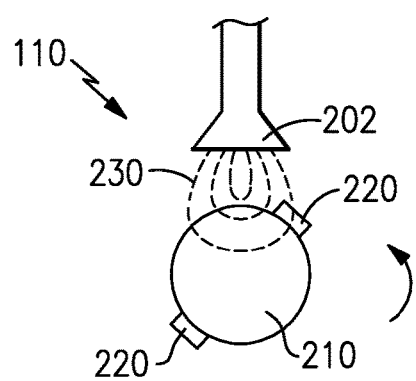
FIG. 5A schematically illustrates a first stage of operation of an anti-windmilling system.
Figure 5B:
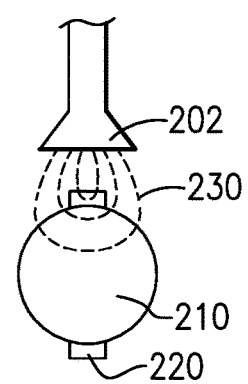
FIG. 5B schematically illustrates a second stage of operation of the anti-windmilling system of FIG. 5A.

With continued reference to FIGS. 3 and 4, and with like numerals indicating like elements, FIGS. 5A and 5B illustrate operation of the anti-windmilling system 110, using a simplified structure. FIG. 5A illustrates a starting position of the anti-windmilling system 110. FIG. 5B illustrates an aligned position (locked) of the anti-windmilling system 110. In the simplified example, the low speed shaft 210 includes two magnetic sections 220 protruding radially outward from the low speed shaft 210. The magnetic sections 220 are 180 degrees offset from each other, providing a balanced weight profile. When the electromagnet 202 activates, and generates an electromagnetic field 230, the magnetic field 230 interacts with and attracts any magnetic sections 220 intersecting with the magnetic field 230. The nearest magnetic section 220 will have the strongest attraction to the electromagnet 202 with the attraction being proportional to the distance between the electromagnet 202 and the magnetic section 220. This attraction causes the low speed shaft 210 to rotate into the aligned position of FIG. 5B.

Once in the aligned position, the magnetic forces of the electromagnetic field 230 are balanced on all of the magnetic sections 220, and the magnetic field 230 holds the low speed shaft 210 in an equilibrium position, preventing the low speed shaft 210 from rotating. As long as power is continuously provided to the electromagnet 202, the low speed shaft 210 is locked, and the fan 102 (illustrated in FIG. 2) is prevented from rotating due to windmilling.

With continued reference to FIGS. 3-5B, FIG. 6 illustrates a cross section of an alternate example anti-windmilling system 110. In the alternate example, each of the magnetic sections 220 extends radially into the low speed shaft 210 rather than radially outward from the low speed shaft 210, 220, as in the previous examples. This configuration results in a relatively smooth shaft circumference. The magnetic sections 220 are distributed evenly about the circumference of the low speed shaft 210. In yet further reconfigurations, the magnetic sections 220 can extend into, and protrude out of, the low speed shaft 210.

With continued reference to FIGS. 3-6, FIG. 7 schematically illustrates another cross section of an alternate example anti-windmilling system 110. The example of FIG. 7, utilizes multiple magnetic sections 220 distributed about the low speed shaft 210 in a balanced manner. The magnetic sections 220 are not distributed evenly, however. One of skill in the art, having the benefit of this disclosure, will understand that in certain cases an even distribution of magnetic sections 220 may be undesirable. By way of example, if a specific orientation of the fan 102 (see FIG. 2) is desired while the anti-windmilling system 110 is activated, the uneven distribution can ensure that the fan 102 is in a specific orientation due to the attractions of the magnetic field (not pictured).

In yet further alternate examples, any number of additional magnetic sections 220 can be used to the same effect.

While described above with regards to bearing systems requiring active lubrication, one of skill in the art will recognize that the described anti-windmilling system can be utilized within geared turbofan systems that do not include components sensitive to wear resulting from windmilling. By way of example, a manual engagement of the anti-windmilling system can facilitate inspection/repair of a geared turbofan engine by allowing a maintenance worker to lock the fan during maintenance or engine inspection. Such a lock would allow the maintenance worker to perform work on the engine without relocating the engine, or aircraft, to an environment that is not subject to wind. Further, one of skill in the art having the benefit of this disclosure could envision any number of additional uses of the above described anti-windmilling system.

Further, while illustrated and described herein using two or four magnetic sections, one of skill in the art will appreciate that any number can be utilized depending on the needs of a given implementation.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor having a first compressor section and a second compressor section;
   a combustor fluidly connected to the compressor;
   a turbine fluidly connected to the combustor, the turbine having a first turbine section and a second turbine section;
   a first shaft connecting the first compressor section and the first turbine section;
   a second shaft connecting the second compressor section and the second turbine section;
   a fan connected to said first shaft via a geared architecture;
   said first shaft including at least one magnetic section, and a single electromagnet structure disposed radially outward of said first shaft at an axial location of the at least one magnetic section, relative to an axis defined by the gas turbine engine.

2. The gas turbine engine of claim 1, wherein the at least one magnetic section includes a plurality of magnetic sections defined circumferentially around said first shaft at a single axial location.

3. The gas turbine engine of claim 2, wherein the plurality of magnetic sections are distributed about said first shaft in a balanced distribution.

4. The gas turbine engine of claim 3, wherein the balanced distribution is an even distribution.

5. The gas turbine engine of claim 1, wherein said at least one magnetic section extends less than a full circumference of the first shaft.

6. The gas turbine engine of claim 1, wherein the single electromagnet structure is mounted to and structurally supported by an engine static structure.

7. The gas turbine engine of claim 1, further comprising a controller controllably coupled to said single electromagnet structure, the controller storing instructions configured to cause the controller to activate the single electromagnet structure during engine shutdown, and de-activate the single electromagnet structure during engine startup.

8. The gas turbine engine of claim 7, wherein the controller further comprises instructions configured to activate the single electromagnet structure in response rotation speed of said first shaft falling below a predefined threshold.

9. The gas turbine engine of claim 1, wherein the single electromagnet structure is coupled to an on-board power storage device, such that the single electromagnet structure is powered by the on-board power storage device.

10. The gas turbine engine of claim 1, wherein the single electromagnet structure is coupled to a power distribution system, and wherein the power distribution system is configured to receive power from a ground power source.

11. The gas turbine engine of claim 1, wherein the first compressor section is a low pressure compressor section relative to the second compressor section, and wherein the first turbine section is a low pressure turbine section relative to the second turbine section.

12. The gas turbine engine of claim 1, wherein the at least one magnetic section is positioned on said first shaft forward of second compressor section, relative to an expected direction of fluid flow through said gas turbine engine.

13. The gas turbine engine of claim 12, wherein the at least one magnetic section is positioned axially within one of an intermediate case and a fan drive gear section of the gas turbine engine.

14. A method for preventing rotation of a shaft in a gas turbine engine comprising:
activating an electromagnet within a gas turbine engine in response to a rotation speed of the shaft falling below a speed threshold;
preventing a shaft from rotating using a magnetic field generated by the electromagnet, thereby preventing a fan mechanically coupled to said shaft from rotating.

15. The method of claim 14, wherein the speed threshold is a rotational speed below which the magnetic field is sufficient to stop rotation of the shaft.

16. The method of claim 14, further comprising powering a lubrication system via rotation of a high shaft at least until said electromagnet is activated.

17. The method of claim 16, wherein the lubrication system provides lubrication to at least one journal bearing.

18. An anti-windmilling system for a gas turbine engine comprising:
a single electromagnet structure mounted to an engine static structure at a first axial position, relative to an axis of the gas turbine engine; and
a shaft radially inward of the single electromagnet structure, the shaft including at least one magnetic section at the first axial position.

19. The anti-windmilling system of claim 18, wherein the electromagnet is mounted in one of an engine intermediate case and between a fan drive gear system at a compressor.

* * * * *